United States Patent [19]
Fukumoto et al.

[11] Patent Number: 5,987,002
[45] Date of Patent: Nov. 16, 1999

[54] MAGNETO-OPTICAL RECORDING MEDIUM AND METHOD AND APPARATUS FOR REPRODUCING DATA THEREFROM

[75] Inventors: Atsushi Fukumoto, Kanagawa; Katsuhisa Aratani, Chiba; Shin Masuhara, Tokyo, all of Japan

[73] Assignee: Sony Corporation, Tokyo, Japan

[21] Appl. No.: 08/918,051

[22] Filed: Aug. 25, 1997

[30] Foreign Application Priority Data

Aug. 29, 1996 [JP] Japan ................................. 8-228973

[51] Int. Cl.$^6$ ........................................... G11B 7/00
[52] U.S. Cl. ..................... 369/275.4; 369/110; 369/13
[58] Field of Search .................... 369/110, 109, 369/112, 275.4, 275.2, 275.1, 13, 58, 47

[56] References Cited

U.S. PATENT DOCUMENTS 5,493,552  2/1996  Kobori ............... 369/275.4 X
5,602,823  2/1997  Aoki et al. ......... 369/275.4 X
5,648,954  7/1997  Satoh ................ 369/275.4 X

*Primary Examiner*—Muhammad Edun
*Attorney, Agent, or Firm*—Hill & Simpson

[57] ABSTRACT

A magneto-optical recording medium formed to record an information signal on both of lands and grooves provides a capability of reproducing an excellent signal with a small magnitude of crosstalk even by narrowing a track interval more. In the magneto-optical recording medium, an optical depth d of each groove is in the range of $(1/12+n/2)\lambda \leq d \leq (1/6+n/2)\lambda$ or $\{-1/6+(n+1)/2\}\lambda \leq d \leq \{-1/12+(n+1)/2\}\lambda$, where $\lambda$ is a wavelength of a light beam to be applied onto the recording medium and n is an integer of 0 or more. When reproducing the information signal from the medium, a phase difference is given to the return light from the medium before detecting the return light.

12 Claims, 13 Drawing Sheets

MAGNETO-OPTICAL RECORDING MEDIUM AND METHOD AND APPARATUS FOR REPRODUCING DATA THEREFROM

BACKGROUND OF THE INVENTION

1. Field of Industrial Application

The present invention relates to a magneto-optical recording medium having information signals recorded on both of lands and grooves thereof and to a method and an apparatus for reproducing the information signals from the magneto-optical recording medium.

2. Description of the Related Art

In general, a disc magneto-optical recording medium termed as a magneto-optical disk contains grooves formed concentrically or spirally on the disk itself. The grooves serve to guide a light beam to be applied onto the magneto-optical disk itself. When recording or reproducing information by applying the light beam onto the magneto-optical disk, the tracking control for the light beam is carried out on the light reflected on the grooves.

This type of magneto-optical disk has been conventionally formed to record an information signal not on the grooves but on the lands located between the adjacent grooves. On the other hand, for the purpose of increasing a recording density, in recent days, a new type of magneto-optical disk is proposed wherein the information signal is recorded on both of the grooves and the lands for widening the recording area.

However, this new type of magneto-optical disk formed to record the information signal on both of the lands and the grooves suffers from a drawback that the information signal is leaked from one track to the adjacent one and thereby a crosstalk is likely to take place, because one groove and the adjacent lands thereto are both served as the recording tracks. By keeping the land substantially equal to the groove in width, setting an optical depth d of the groove to a closer value to $\lambda/6$ and setting a Kerr ellipticity of a magneto-optical effect caused by a magneto-optical recording film contained in the magneto-optical disk to 0 or a closer value thereto, it is possible to reduce the crosstalk and reproduce the signal from the tracks if the interval between the adjacent tracks is narrow.

FIG. 1 shows relation between a crosstalk and a depth of the groove with a track interval as a parameter. In FIG. 1, a laser beam to be applied onto the magneto-optical disk has a wavelength $\lambda$ of 690 nm and an objective lens for condensing the laser beam onto the magneto-optical recording medium has a numerical aperture NA of 0.55, where the depth of the groove corresponding to a value of $\lambda/6$ is about 77 nm.

As is understood from FIG. 1, when the optical depth d of the groove is close to a value of $\lambda/6$, the crosstalk is made minimal. In case that the track interval is made narrower, the crosstalk is likely to be minimal when the groove is made deeper. That is, when the track interval is made narrower for increasing the recording density, it is necessary to deepen the groove for the purpose of reducing the crosstalk.

Next, FIG. 2 shows relation between a Level of a signal reproduced from the track and a groove depth when the track interval is 0.5 $\mu$m. As shown in FIG. 2, the reproduction signal level is made smaller as the groove is made deeper, in which the reproduction signal level becomes minimal when the groove is $\lambda/4$ in depth. Further, the reproduction signal from the track becomes inferior in frequency characteristic as the groove is made deeper. Hence, from a viewpoint of obtaining a higher reproduction signal level, it is preferable to keep the groove shallower.

As shown in FIG. 1, when the track interval is kept narrower, for reducing the crosstalk, it is necessary to deepen the groove. As shown in FIG. 2, however, if the groove is made deeper when the track interval is narrow, the reproduction signal is degraded.

Hence, conventionally, the magneto-optical disk formed to record the information signal on both of the grooves and the lands has been requested to restrict the interval of the track. This type of magneto-optical disk, therefore, has difficulty in greatly improving its recording density.

OBJECT AND SUMMARY OF THE INVENTION

The present invention has been proposed in consideration of the foregoing conventional circumstances, and it is an object of the present invention to provide a magneto-optical recording medium for recording an information signal on both of lands and grooves in which even the narrow interval between the adjacent tracks reduces the crosstalk so that the medium may output an excellent reproduction signal.

In carrying out the object, the completed magneto-optical recording medium according to the present invention formed to record an information signal on both of grooves and lands located between the adjacent grooves is characterized in that where the light beam applied onto the magneto-optical recording medium has a wavelength of $\lambda$ and n is an integer of 0 or more, the optical depth d of the groove is in the range of $(1/12+n/2)\lambda \leq d \leq (1/6+n/2)\lambda$ or $\{-1/6+(n+1)/2\}\lambda \leq d \leq \{-1/12+(n+1)/2\}\lambda$.

Herein, preferably, the optical depth d of the groove should be in the range of $(1/12+n/2)\lambda \leq d \leq (1/8+n/2)\lambda$ or $\{-1/8+(n+1)/2\}\lambda \leq d \leq \{-1/12+(n+1)/2\}\lambda$. Where the numerical aperture of the lens for condensing the light beam onto the magneto-optical recording medium is NA, it is preferable to restrict the track interval to be 0.64 $\lambda$/NA or lower.

The magneto-optical recording medium described above has the optical depth d of the groove which is in the range of $(1/12+n/2)\lambda \leq d \leq (1/6+n/2)\lambda$ or $\{-1/6+(n+1)/2\}\lambda \leq d \leq \{-1/12+(n+1)/2\}\lambda$. Hence, when the information signal is reproduced by applying the light beam onto the magneto-optical recording medium and detecting the return light, by controlling a phase difference of the return light, it is possible to obtain a high-level reproduction signal with a small magnitude of crosstalk.

According to another aspect of the invention, an apparatus for reproducing the information signal from the magneto-optical recording medium having the information signal recorded on both of the grooves and the lands is characterized to include a light source for applying the light beam onto the magneto-optical recording medium and a phaser located on an optical axis of the return light from the medium and for changing a phase difference of the return light and in that the return light from the groove is different from the return light from the land in respect of variation of the phase difference caused by the phaser.

The phaser may provide a variable phaser for changing the phase difference of the light passed therethrough with the voltage applied thereto or provide a polarizer for polarizing the return light and a phase plate located on the optical axis of the light passed therethrough.

The reproducing apparatus as described above is arranged to apply a light beam from a light source onto the magneto-optical recording medium and change a phase difference of the return light from the magneto-optical recording medium through the effect of the phaser. The phaser serves, to change the phase difference of the return light so that the phase difference of the return light from the land is different from the phase difference of the return light from the groove. By controlling the phase difference of the return light, it is possible to obtain a high-level reproduction signal with a small magnitude of crosstalk from the magneto-optical recording medium.

According to another aspect of the invention, a reproducing apparatus arranged to reproduce the information signal from the magneto-optical recording medium having the information signal recorded on both of the grooves and the lands is characterized to include a light source for applying a light beam onto the magneto-optical recording medium and a polarizing beam splitter located on an optical axis between the light source and the magneto-optical recording medium and for separating the light beam from the light source into two kinds of light beam having their own polarizing states and in that one of the light beam portions separated by the polarizing beam splitter is used for reproducing the information signal recorded on the grooves and the other one is used for reproducing the information signal recorded on the lands.

The reproducing apparatus described above is arranged to separate the light beam applied from the light source into two beams having respective polarizing states through the polarizing beam splitter and then apply the separated beams onto the magneto-optical recording medium. Hence, the polarizing state of the light beam entered into the lands is different from the polarizing state of the light beam entered into the grooves. Hence, by locating the phaser for changing the phase difference according to the polarizing state on the optical axis of the return light, it is possible to control the phase difference of the return light from the grooves and the phase difference of the return light from the lands respectively. Further, by controlling the phase difference of the return light, it is possible to obtain the high-level reproduction signal with a small magnitude of crosstalk from the magneto-optical recording medium.

According to another aspect of the invention, a reproducing method is characterized in that where the light beam to be applied onto the magneto-optical recording medium has a wavelength of $\lambda$ and n is an integer of 0 or more, the grooves are formed to have an optical depth d of $(1/12+n/2)\lambda \leq d \leq (1/6+n/2)\lambda$ or $\{-1/6+(n+1)/2\}\lambda \leq d \leq \{-1/12+(n+1)/2\}\lambda$ and the light beam is applied to the magneto-optical recording medium having the information signal recorded on both of the grooves and the lands located between the adjacent grooves and the return light from the magneto-optical recording medium is detected for the purpose of reproducing the information signal recorded on the magneto-optical recording medium.

This reproducing method is arranged to keep the optical depth of the grooves formed on the magneto-optical recording medium in the range of $(1/12+n/2)\lambda \leq d \leq (1/6+n/2)\lambda$ or $\{-1/6+(n+1)/2\}\lambda \leq d \leq \{-1/12+(n+1)/2\}\lambda$. Hence, when the information signal is reproduced by applying the light beam onto the magneto-optical recording medium and detecting the return light from the recording medium, by controlling the phase difference of the return light, it is possible to obtain the high-level reproduction signal with a small magnitude of crosstalk.

BRIEF DESCRIPTION OF THE DRAWINGS

Other characteristics and advantages of the present invention appear more clearly from the following description and with reference to the accompanying drawings, in which.

DESCRIPTION OF THE PREFERRED EMBODIMENTS

Later, the description will be oriented to a magneto-optical recording medium as an example of a magneto-optical disk along the concrete embodiments of the present invention with reference to the appended drawings.

It goes without saying that the present invention is not limited to the following embodiments and may be optionally modified without departing from the spirit of the invention. For example, the magneto-optical recording medium to which the present invention applies may be any magneto-optical medium if an information signal is recorded on both of the lands and the grooves of the medium.

Figure 3:
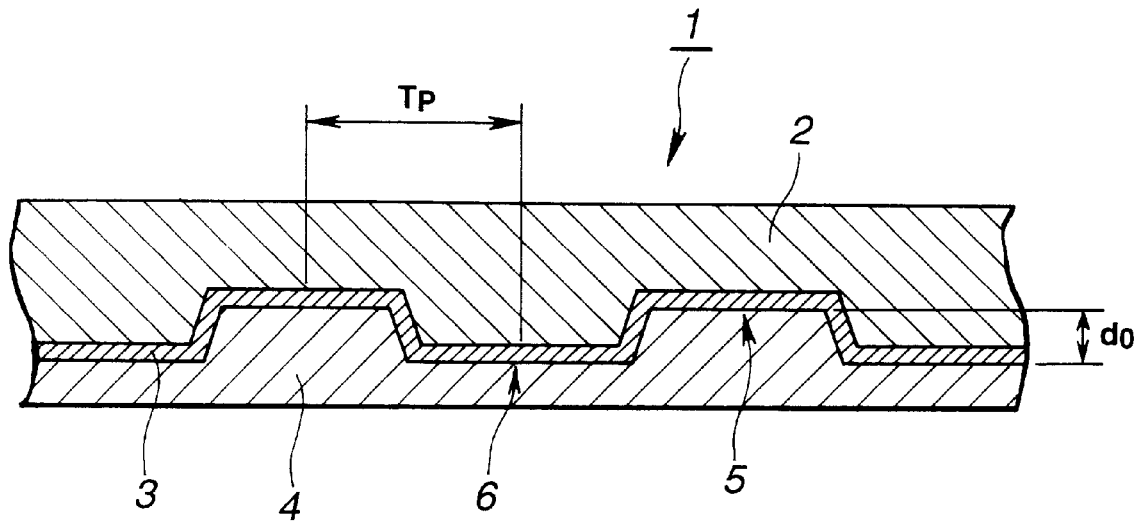
FIG. 3 is a section view showing an essential part of a magneto-optical disk to which the present invention applies.

As shown in FIG. 3, a numeral 1 denotes a magneto-optical disk, which includes a disk substrate 2 having light transmission, a magneto-optical recording film 3 formed on the disk substrate 2, and a protective film 4 formed on the magneto-optical recording film 3.

The disk substrate 2 is formed of a synthetic resin material such as polycarbonate or PMMA and to be disc. On one side of the disk substrate 2 are formed concentric or spiral grooves 5. The groove 5 serves to control tracking of a light beam applied onto the magneto-optical disk 1 when recording or reproducing a signal on the medium. An area between the adjacent grooves 5 is termed a land 6, in which a width of the groove 5 is substantially equal to a width of the land 6.

Figure 4:
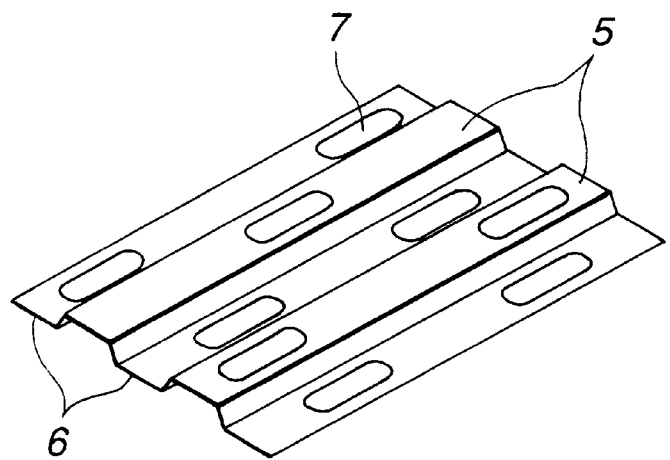
FIG. 4 is a model view showing grooves and lands of the magneto-optical disk shown in FIG. 3.

On the magneto-optical disk 1, an information signal is recorded on both of the groove 5 and the land 6. That is, as shown in FIG. 4, a recording mark 7 indicating the information signal is written on both of the groove 5 and the land 6 located between the adjacent grooves 5.

Figure 5:
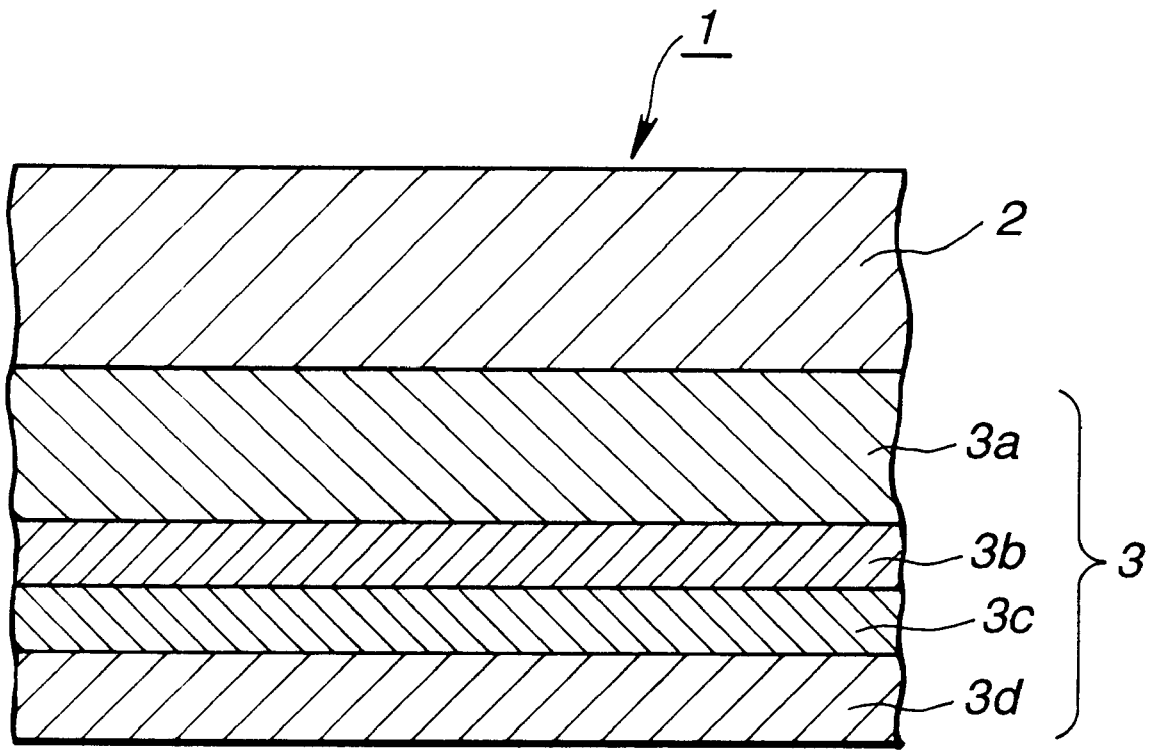
FIG. 5 is a section view showing a structure of a magneto-optical recording film contained on the magneto-optical disk shown in FIG. 3.

The magneto-optical recording film 3 formed on the disk substrate 2 having the grooves 5 is constructed of a limitation of films are formed by a specific technique such as evaporation or sputtering. Concretely, as shown in FIG. 5, the magneto-optical recording film 3 is formed of a first film 3a of SiN, a second film 3b of a vertical magnetic recording material such as TbFeCo, a third film 3c of SiN, and a fourth film 3d of a highly reflective material such as Al, which are laminated on the disk substrate 2 in the describing sequence.

A numeral 4 denotes a protective film formed on the magneto-optical recording film 3. The protective film 4 serves to protect the magneto-optical recording film 3 and is formed of a synthetic resin material such as ultraviolet rays hardening resin in a manner to cover the magneto-optical recording film 3.

When recording the information signal on the magneto-optical disk 1, a magnetic field is applied from the side of the protective film 4 to the magneto-optical recording film 3 and the light beam is applied from the side of the disk substrate 2 to the magneto-optical recording film 3. By this operation, the information signal is recorded as a magnetizing state of the magneto-optical recording film 3.

When reproducing the information signal recorded on the magneto-optical disk 1, the light beam is applied from the side of the disk substrate 2 to the magneto-optical recording film 3 and the return light of the light beam is detected. The Kerr effect causes the polarized plane of the return light to be rotated depending on the magnetizing state of the magneto-optical recording film 3. By detecting the rotation of the polarized plane, the magnetizing state of the magneto-optical recording film 3 is detected. By this, the information signal recorded on the magneto-optical recording film 3 in the magnetizing state is scanned out.

Then, the description will be oriented to the relation between the characteristic of the reproduction signal and the depth d0 of the groove 5 with respect to the magneto-optical disk 1 constructed as described above.

Figure 1:
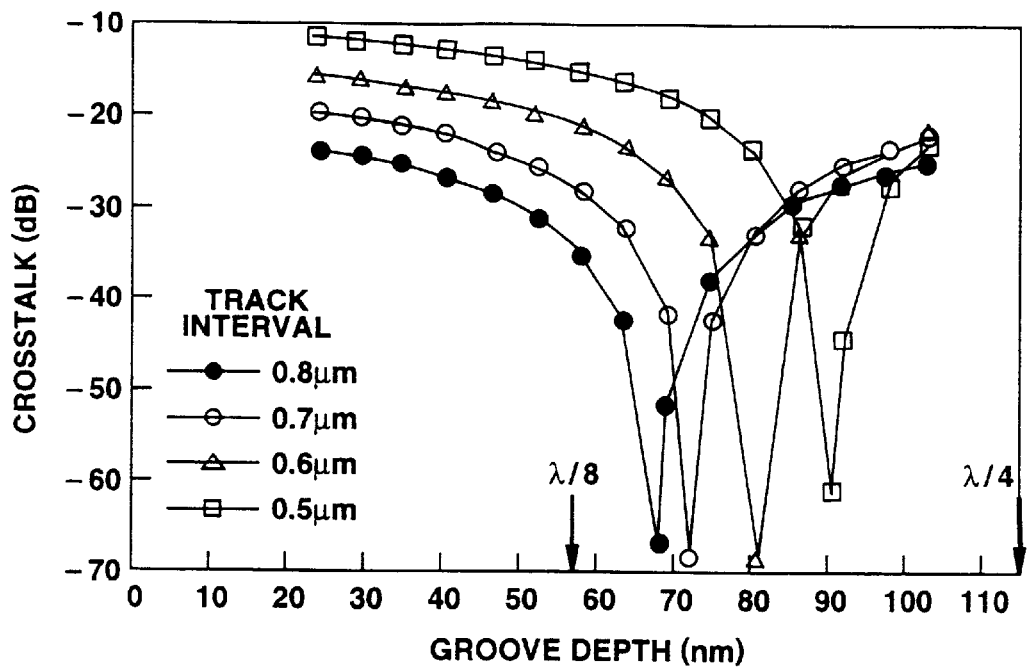
FIG. 1 is a characteristic graph showing relation between a groove depth and a crosstalk with a track interval as a parameter.

As shown in FIG. 1, in a case that the track interval Tp, that is, an interval between the center of the groove 5 and the center of the land 6 is narrow, the crosstalk is likely to be minimal when the depth d0 of the groove 5 is relatively deep. In FIG. 1, it is assumed that the Kerr effect ellipticity given by the magneto-optical recording film 3 is substantially zero. In this assumption, the crosstalk characteristic appearing when reproducing the information signal recorded on the groove 5 is substantially identical with the crosstalk characteristic appearing when reproducing the information signal recorded on the land 6.

Figure 2:
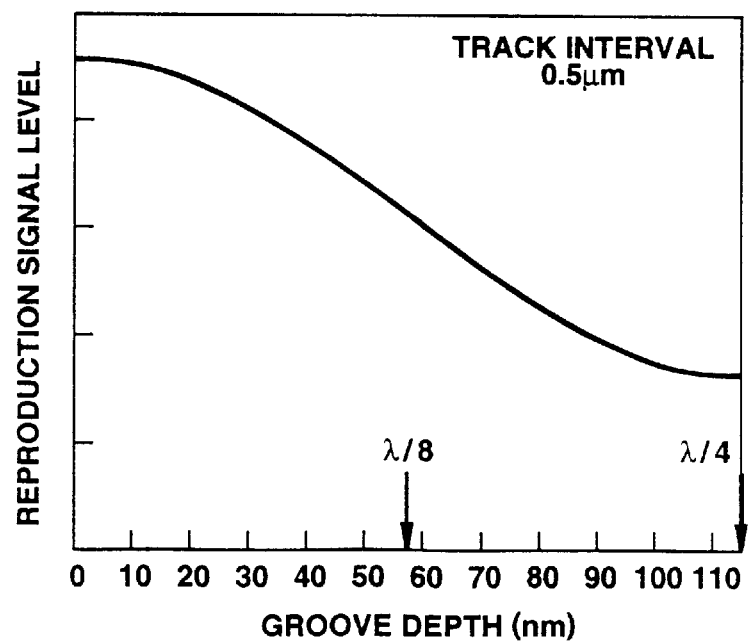
FIG. 2 is a characteristic graph showing relation between a groove depth and a reproduction signal level.

In FIG. 1, remarking the case that the track interval Tp is 0.5 μm, it is understood that the crosstalk becomes minimal when the depth of the groove is about 90 μm. As shown in FIG. 2, however, when the track interval Tp is 0.5 μm and the depth d0 of the groove is about 90 μm, the reproduction signal level is relatively small. Conventionally, therefore, the magneto-optical disk formed to record the information signal on both of the grooves and the lands has difficulty in narrowing the track interval Tp, thereby restricting improvement of the recording density.

Figure 6:
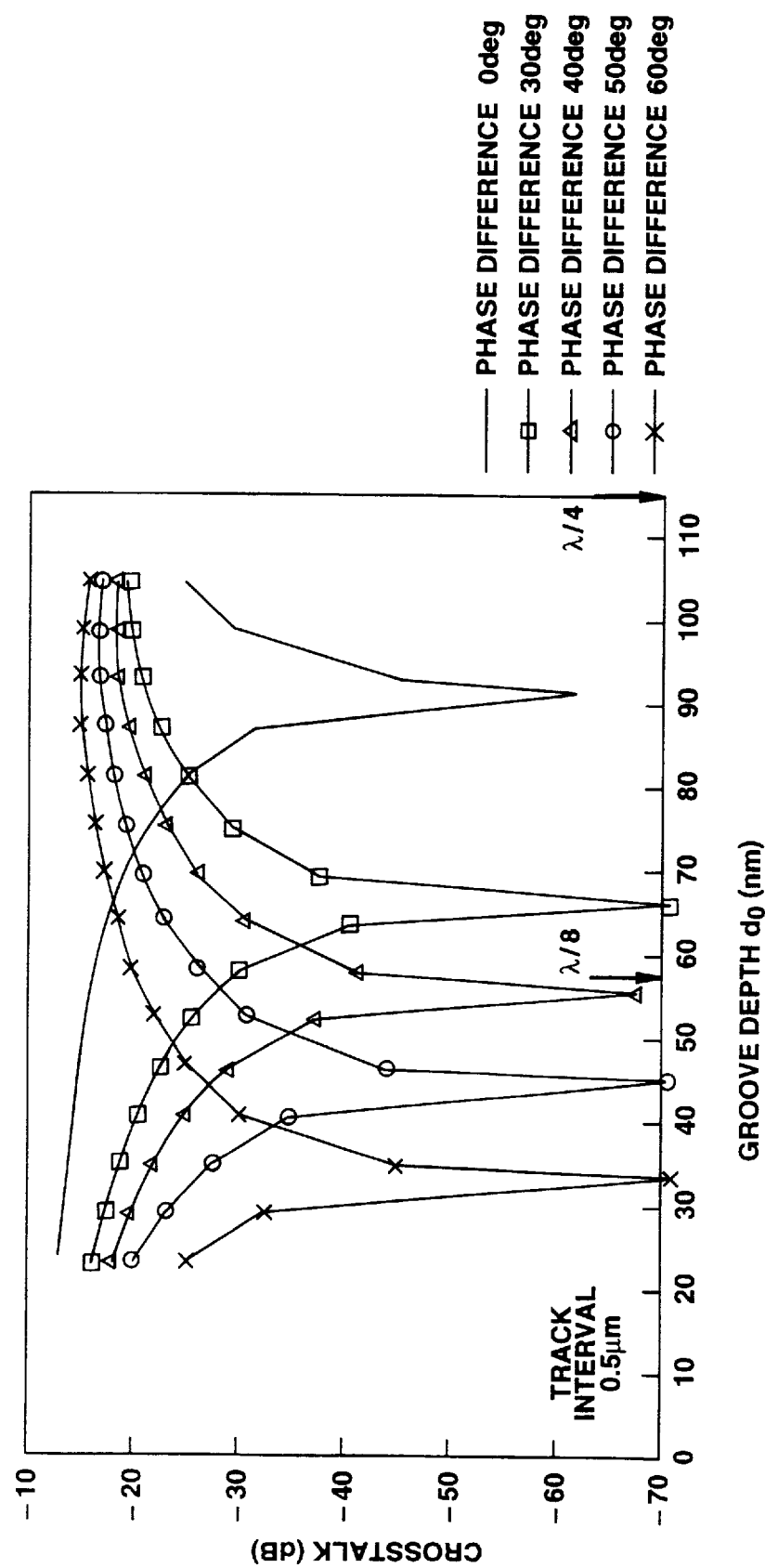
FIG. 6 is a characteristic graph showing relation between a groove depth and a crosstalk with a phase difference of return light as a parameter.

By the way, as shown in FIG. 6, the behavior of the crosstalk depends on the phase difference of the return light from the magneto-optical disk 1. FIG. 6 shows relation between the groove depth d0 and the crosstalk with the phase difference of the return light from the land as a parameter, in which case the information signal is reproduced from the land 6.

As shown in FIG. 6, by enlarging the phase difference of the return light from the land 6, the crosstalk is made smaller as the groove depth d0 is more shallow. Concretely, by giving the phase difference of 50 deg to the return light from the land 6, when the groove depth d0 is about 45 nm, the crosstalk becomes minimal.

Figure 7:
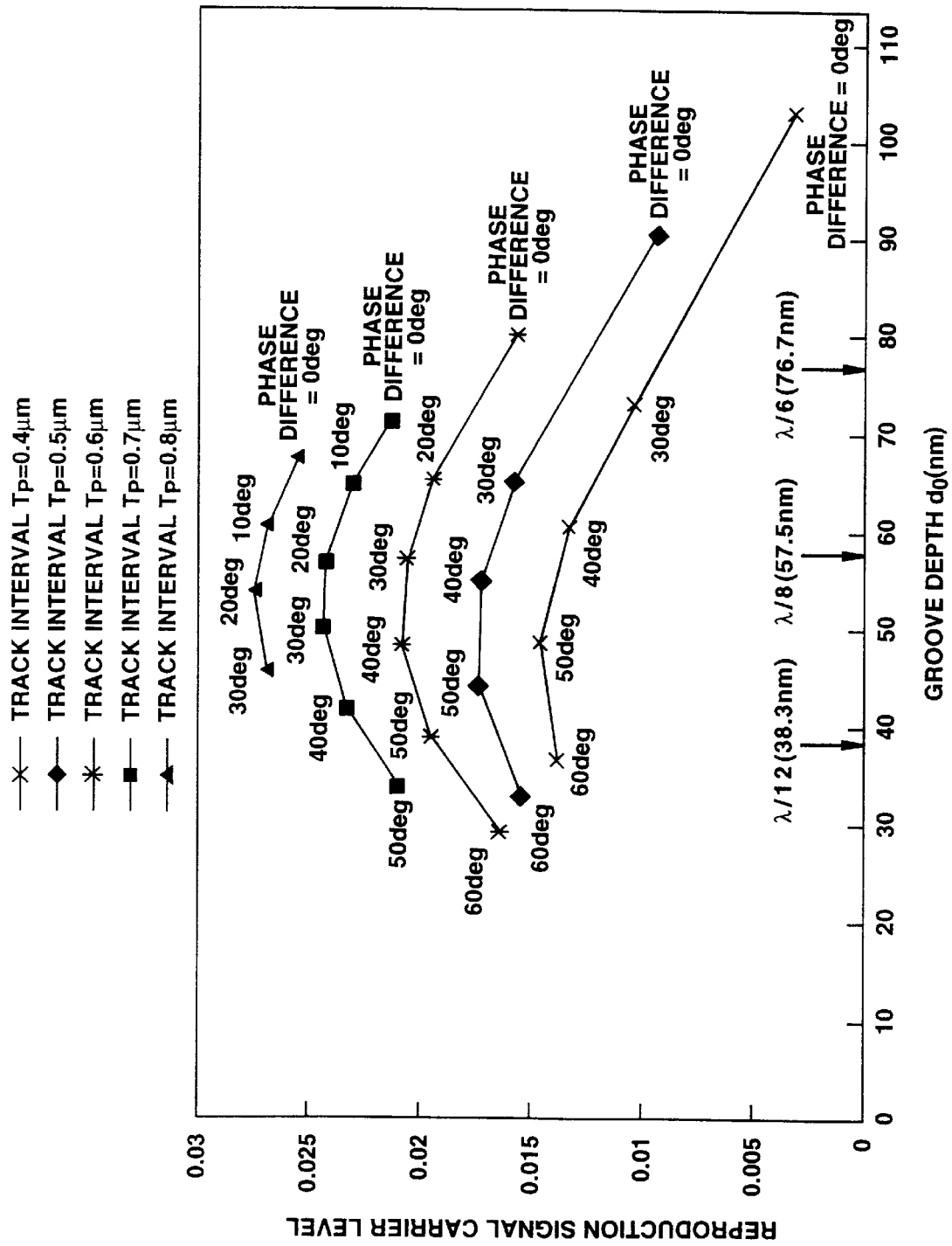
FIG. 7 is a characteristic graph showing a reproduction signal level against a groove depth for minimizing a crosstalk with respect to various track intervals when changing a phase difference of return light.

FIG. 7 shows the relation between the reproduction signal levels for the groove depth d0 for minimizing the crosstalk and various track intervals Tp. In FIG. 7, the light beam applied onto the magneto-optical disk 1 has a wavelength λ of 690 nm and the objective lens for condensing the light beam onto the magneto-optical disk 1 has a numerical aperture NA of 0.55.

FIG. 7 shows the relation between the groove depth d0 for minimizing the crosstalk and the reproduction signal level at the depth d0 in several cases of providing the return light from the land 6 with the phase differences of 0 deg, 30 deg, 40 deg, 50 deg or 60 deg when the track interval Tp is 0.4 μm, providing the return light from the land 6 with the phase difference of 0 deg, 30 deg, 40 deg, 50 deg or 60 deg when the track interval Tp is 0.5 μm, providing the return light from the land 6 with the phase difference of 0 deg, 20 deg, 30 deg, 40 deg, 50 deg or 60 deg when the track interval Tp is 0.6 μm, providing the return light from the land 6 with the phase difference of 0 deg, 10 deg, 20 deg, 30 deg, 40 deg or 50 deg when the track interval Tp is 0.7 μm, and providing the return light from the land 6 with the phase difference of 0 deg, 10 deg, 20 deg or 30 deg when the track interval Tp is 0.8 μm.

As will be understood from FIG. 7, by giving a proper value to the groove depth d0 and providing the return light with a proper phase difference, it is possible to improve the reproduction signal level as suppressing the crosstalk. Concretely, assuming that the optical depth d is derived by multiplying the physical depth d0 of the groove by the refractive index of the disk substrate 2, by keeping the optical depth of the groove 6 in the range of $\lambda/12 \leq d \leq \lambda/6$, more preferably, $\lambda/12 \leq d \leq \lambda/8$ and providing the return light with the proper phase difference, it is possible to improve the reproduction signal level as suppressing the crosstalk.

Concretely, assuming that the track interval Tp is 0.5 μm and the groove depth d0 is arranged to set the crosstalk to a minimal value, by providing the return light with the phase difference of 40 to 50 deg, it is understood that the reproduction level has a maximum value. The reproduction signal level at that value is about twice as large as the signal level provided when the phase difference of the return light is 0 deg where the crosstalk becomes minimal, that is, when the groove depth is 90 nm.

Figure 8:
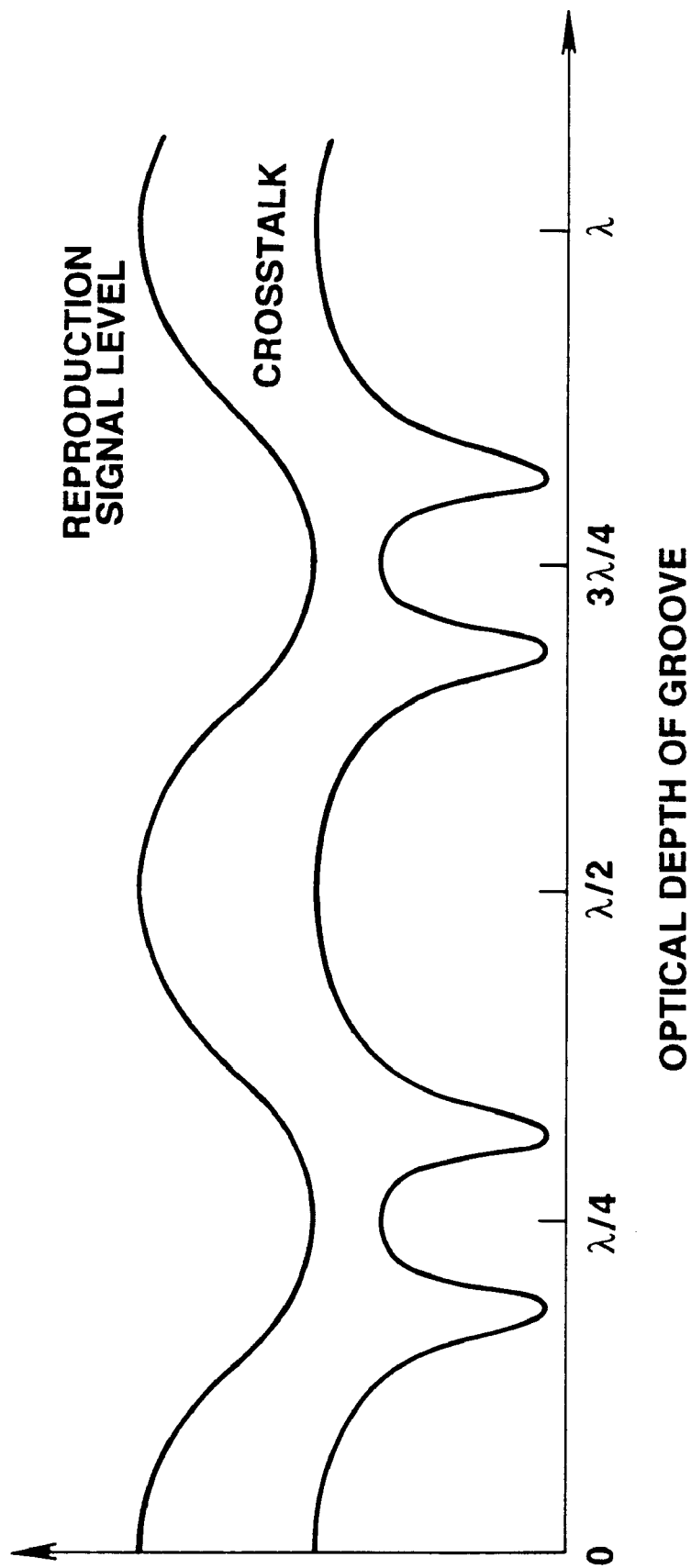
FIG. 8 is a characteristic graph showing relation among a groove depth, a reproduction signal level and a crosstalk.

By the way, in general, the characteristic of the reproduction signal from the magneto-optical disk 1 periodically changes with the optical depth d of the groove 5. As an example, FIG. 8 shows relation between a typical reproduction signal level and a crosstalk characteristic. That is, in general, the reproduction signal characteristic of the magneto-optical disk is symmetrical on the border of the optical depth d=$\lambda$/4 of the groove 5 and has a period of $\lambda$/2. Hence, assuming that n is an integer of 0 or more, the condition of $\lambda/12 \leq d \leq \lambda/6$ about the optical depth d of the groove 5 is expanded into $(1/12+n/2)\lambda \leq d \leq (1/6+n/2)\lambda$ or $\{-1/6+(n+1)/2\}\lambda \leq d \leq \{-1/12+(n+1)/2\}\lambda$. Likewise, the condition of $\lambda/12 \leq d \leq \lambda/8$ is expanded to the condition of $(1/12+n/2)\lambda \leq d \leq (1/8+n/2)\lambda$ or $\{1/8+(n+1)/2\}\lambda \leq d \leq \{-1/12+(n+1)/2\}\lambda$.

As is understood from FIG. 7, the narrower track interval Tp leads to lessening the improving effect of the reproduction signal level caused by giving the return light with the phase difference. Concretely, the improving effect of the reproduction signal level caused by providing the return light with the phase difference is quite large when the track interval Tp is 0.8 $\mu$m or lower but is hardly expected when the track interval Tp exceeds 0.8 $\mu$m. Herein, the condition that the track interval Tp is 0.8 $\mu$m or lower may be generalized by using the wavelength $\lambda$ of the light beam and the numerical aperture NA of the objective lens. As a result, the track interval Tp is 0.64 $\lambda$/NA where $\lambda$=690 nm and NA =0.55. In particular, when the track interval is 0.64 $\lambda$/NA or lower, the reproduction signal level can be remarkably improved by providing the return light with the phase difference.

The foregoing description has been concerned with the reproduction of the information signal from the land. The crosstalk appearing in reproducing the information signal recorded on the groove 5 and the behavior of the reproduction signal level are likewise to those behaviors about the land 5 if the phase difference is reversed. That is, the crosstalk appearing when reproducing the information from the groove and the behavior of the reproduction signal level are equivalent to those about the reproduction of the information from the land if the phase difference given to the return light is an equivalent opposite sign.

When reproducing the information from the groove, therefore, the optical depth d of the groove 5 is kept in the range of $(1/12+n/2)\lambda \leq d \leq (1/6+n/2)\lambda$ or $\{-1/6+(n+1)/2\}\lambda \leq d \leq \{-1/12+(n+1)/2\}\lambda$ and the proper negative phase difference is given to the return light, for improving the reproduction signal level as suppressing the crosstalk.

Figure 9:
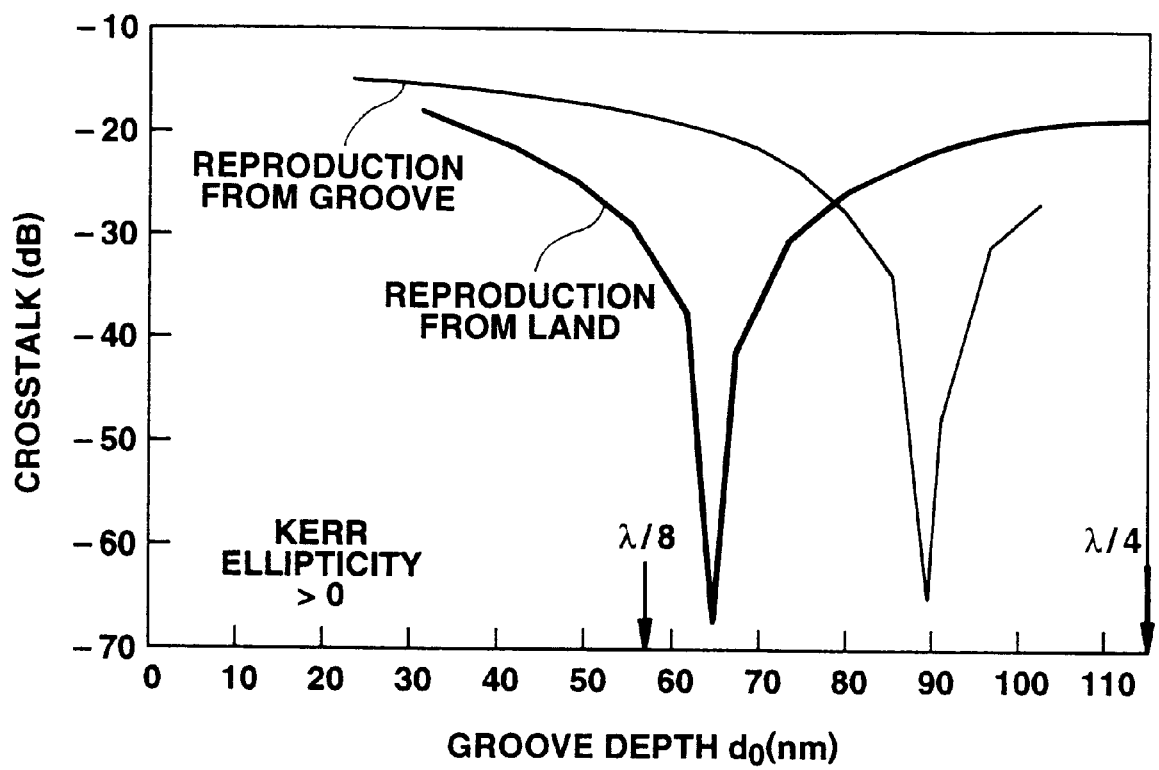
FIG. 9 is a characteristic graph showing dependency of the crosstalk on the groove depth when reproducing a signal from lands and dependency of the crosstalk on the groove depth when reproducing a signal from grooves when a Kerr ellipticity appears.

When the Kerr ellipticity of the magneto-optical recording film 3 has a finite value, as shown in FIG. 9, the dependency of the groove depth d0 on the crosstalk appearing when reproducing the information from the land does not coincide with the dependency appearing when reproducing the information from the groove. In this case, a phase difference of one absolute value is given to the return light from the groove and a phase difference of another absolute value is given to the return light from the land so that the minimal value of the crosstalk appearing when reproducing the information from the land may coincide with the minimal value of the crosstalk appearing when reproducing the information from the groove. By this, even if the Kerr ellipticity of the magneto-optical recording film 3 has a finite value, it is possible to suppress both of the crosstalks appearing when reproducing the information from the land and the groove.

As is obvious from the foregoing description, the magneto-optical disk formed to record the information signal on both of the lands and the grooves may be arranged to set the groove depth d0 to a proper value and give respective phase differences to the return lights from the land and the groove. This arrangement results in implementing the high reproduction signal level and the low crosstalk, thereby being able to record and reproduce the signal at a high track density.

Figure 10:
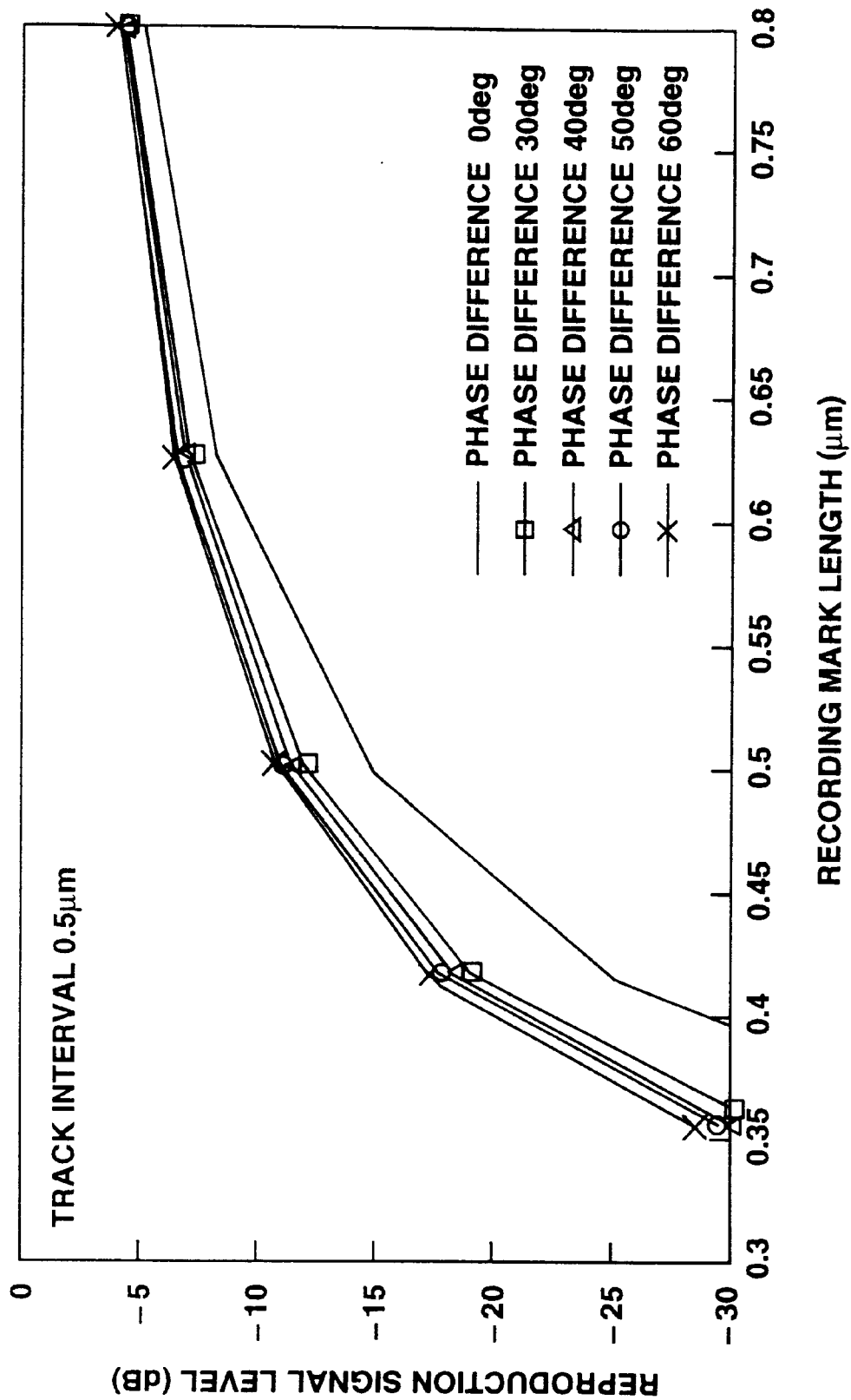
FIG. 10 is a characteristic graph showing relation between a recording mark length and a reproduction signal level with a phase difference of return light as a parameter.

Further, the frequency characteristic of the reproduction signal changes depending on the magnitude of the phase difference given to the return light. FIG. 10 shows the reproduction signal level against the recording mark length with the phase difference given to the return light as a parameter. In FIG. 10, since the track interval Tp is 0.5 $\mu$m, the reproduction signal level is normalized at the value corresponding to the mark length 2 $\mu$m. As is understood from FIG. 10, by providing the return light with the phase difference, the frequency characteristic of the reproduction signal is improved.

Figure 11:
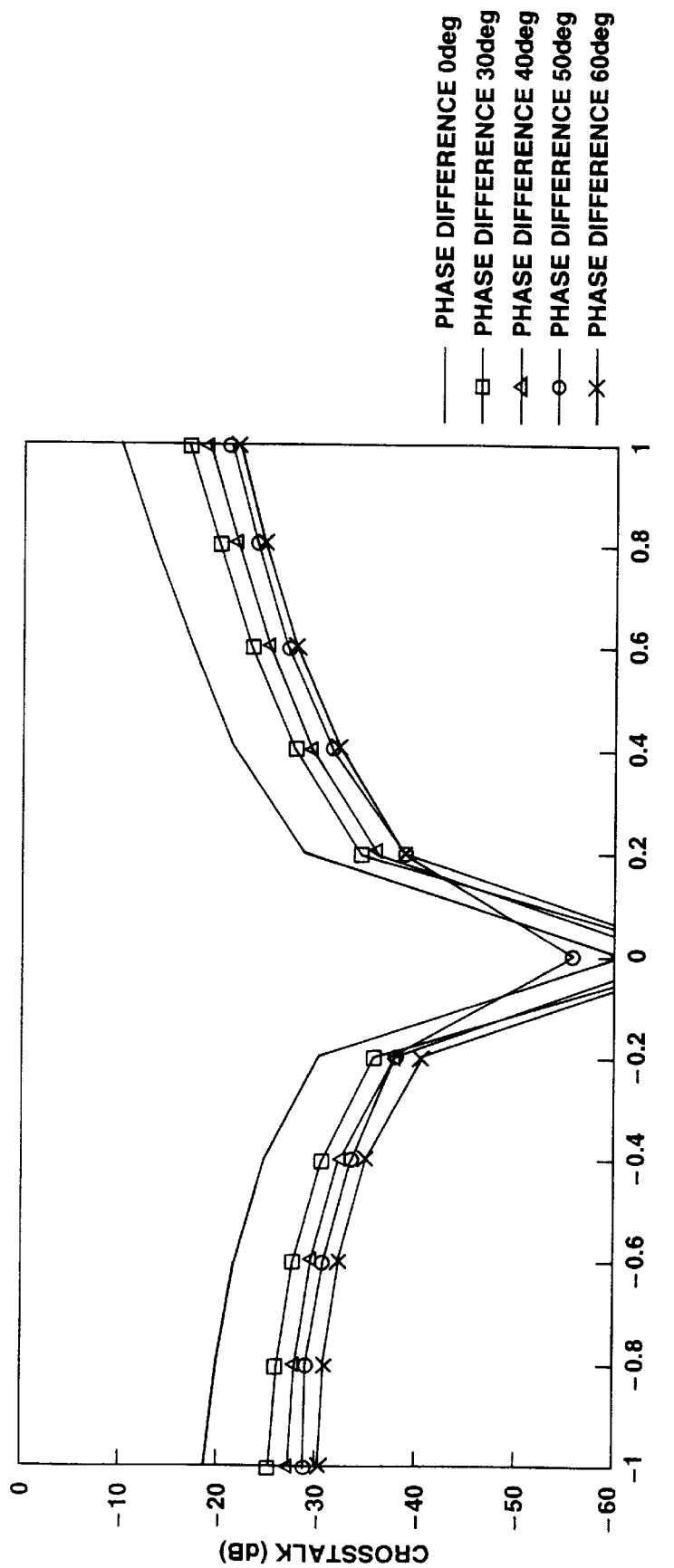
FIG. 11 is a characteristic graph showing relation between a tilt angle of a recording plane of the magneto-optical disk and the relevant crosstalk with a phase difference of return light as a parameter.

Moreover, the crosstalk resulting from the tilt of the magneto-optical disk 1 changes depending on the magnitude of the phase difference given to the return light. FIG. 11 shows relation between the tilt angle of the recording plane of the magneto-optical disk 1 against the optical axis of the light beam applied onto the magneto-optical disk 1 and the crosstalk. In FIG. 11, it is assumed that the light beam applied to the magneto-optical disk 1 has a wavelength $\lambda$ of 690 nm, the objective lens for condensing the light beam onto the magneto-optical disk 1 has a numerical aperture NA of 0.55, and the track interval Tp is 0.5 $\mu$m. As will be understood from FIG. 11, by giving the phase difference to the return light, it is possible to suppress the crosstalk resulting from the tilt of the magneto-optical disk.

When recording or reproducing the information signal on or from both of the groove 5 and the land 6, by using an astigmatism in a focus-servo system, the focus error signal produced when recording or reproducing the information signal on or from the groove 5 is offset with the focus error signal produced when recording or reproducing the information signal on or from the land 6. This offset is made to be a maximum value when the optical depth d of the groove 5 is close to $(1/6+n/2)\lambda$ or $(-1/6+(n+1)/2)\lambda$. However, when the present invention is applied to the magneto-optical disk 1, by controlling the phase difference of the return light, it is possible to reduce the optical depth d of the groove 5 and thereby lessening the offset.

In turn, the description will be oriented to a concrete embodiment of a reproducing apparatus arranged to provide the return light from the magneto-optical disk 1 with the phase difference, detect the return light from the magneto-optical disk 1, and reproduce the information signal based on the return light. The below-described reproducing apparatus is likewise to the conventional reproducing apparatus except means for providing the return light with the phase difference.

Figure 12:
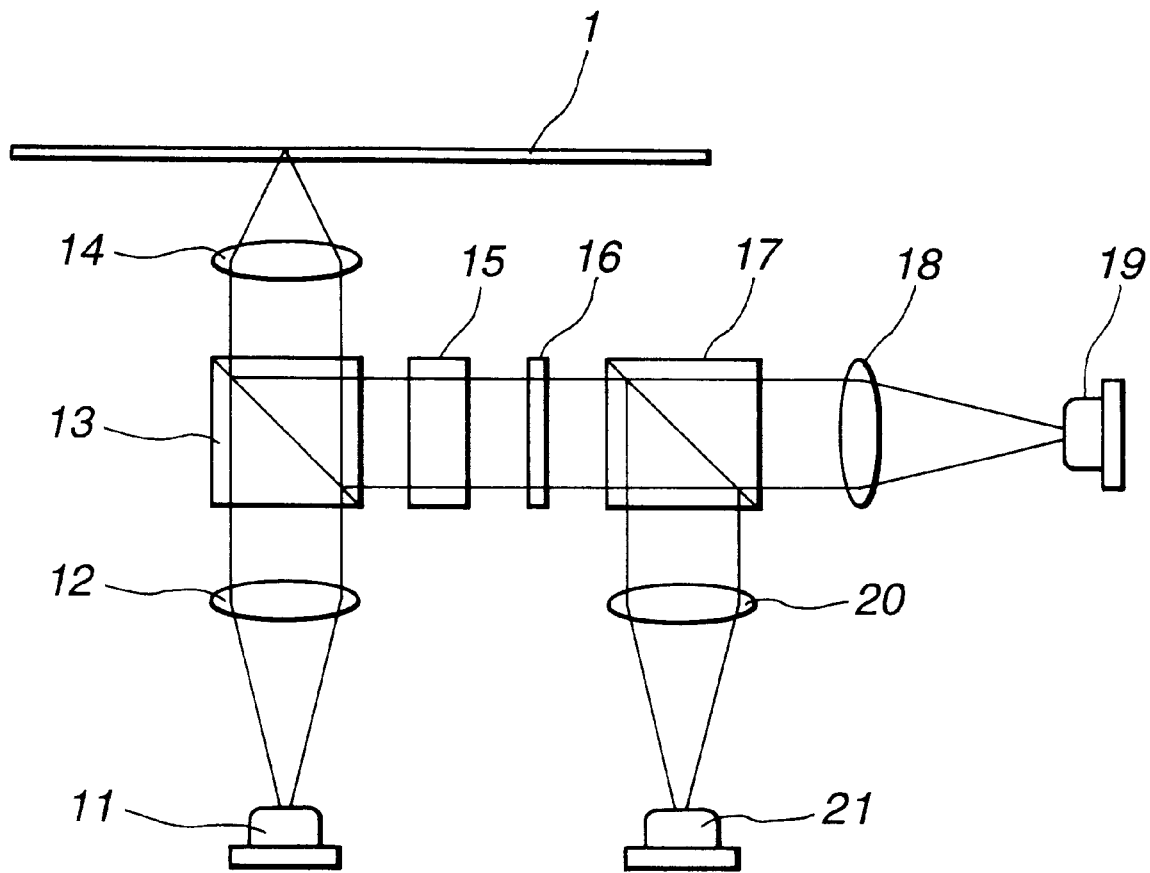
FIG. 12 is a view showing a construction of a reproducing apparatus to which the present invention applies.

As shown in FIG. 12, the reproducing apparatus according to this embodiment of the invention includes a light source 11 such as a semiconductor laser for emitting a light beam of a given wavelength, a collimator lens 12 for converting the light beam from the light source 11 into a parallel beam, a beam splitter 13 for separating the light beam into the beam from the light source 11 and the return light, and an objective lens 14 for condensing the light beam from the light source 11 onto the magneto-optical disk 1.

The reproducing apparatus includes a phaser 15 for changing the phase difference of the return light from the magneto-optical disk 1, a half wavelength plate 16 for providing the return light from the disk 1 with a phase difference of λ/2, a polarizing beam splitter 17 for separating the return light passed through the half wavelength plate 16 into a P polarized component and an S polarized component, a first condensing lens 18 for condensing one of the polarized components separated by the polarizing beam splitter 17, a first photo detector 19 for detecting the polarized light condensed by the first condensing lens 18, a second condensing lens 20 for condensing the other one of the polarized components separated by the polarizing beam splitter 17, and a second photo detector 21 for detecting the polarized light condensed by the second condensing lens 20.

The phaser 15 is an optical element for controlling the phase amount of the return light from the magneto-optical disk 1 and is located on the optical axis of the return light from the disk 1. The return light from the groove 5 is different from the return light from the land 6 in respect of variation of the phase difference caused by the phaser 15. The return light from the magneto-optical disk 1 is provided with a given phase difference by the phaser 15 and then is detected by the first photo detector 19 and the second photo detector 21. The detection results in reproduction of the information signal.

Figure 13:
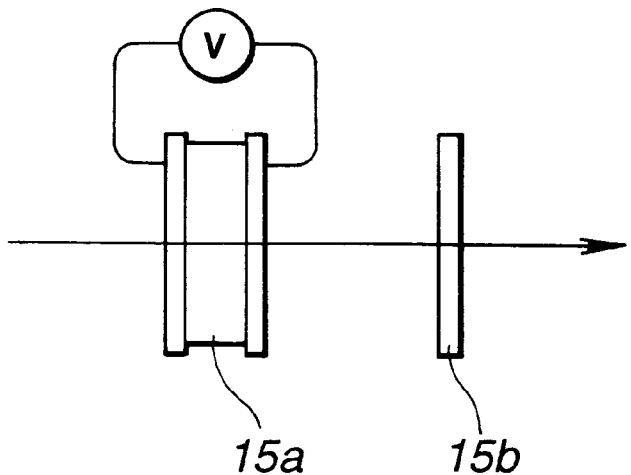
FIG. 13 is a view showing a phaser provided with a variable phaser and a wavelength plate.

As shown in FIG. 13, for example, the phaser 15 is arranged to provide a variable phaser 15a for changing the phase difference of the passed light on the voltage applied thereon. This kind of variable phaser 15a may be a phase modulator provided with liquid crystal or electro-optical crystal, for example.

In the case of using this kind of variable phaser 15a, when the phase difference to be given to the return light from the land 6 is Δ and the phase difference to be given to the return light from the groove 5 is −Δ, about the negative phase difference −Δ, it is just possible to provide the positive phase difference of 360 deg −Δ.

When the dynamic range of the variable phaser 15a is 360 deg or lower, for producing the positive and negative phase differences, as shown in FIG. 13, the wavelength plate 15b, which is a fixed phaser, may be used. That is, by setting the phase difference caused by the wavelength plate 15b as Δ, setting the phase difference given to the return light by the variable phaser 15a when reproducing the information from the groove as 0 and setting the phase difference given to the return light by the variable phaser 15a when reproducing the information from the land as 2Δ, it is possible to derive the phase difference of the return light from the land 6 as Δ and the phase difference of the return light from the groove 5 as −Δ.

When controlling the phase difference of the return light in the aforementioned manner, it is possible to provide the proper phase difference through the variable phaser 15a as observing the quality of the signal to be reproduced such as fluctuation of the reproduction signal, for automatically controlling the phase difference of the return light.

Figure 14:
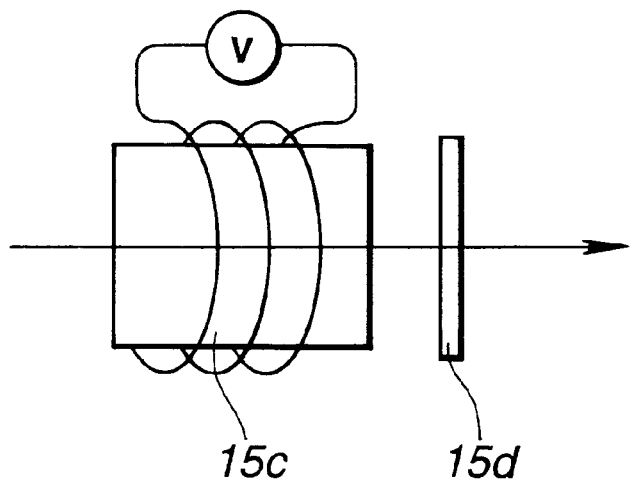
FIG. 14 is a view showing a phaser provided with a variable polarizer and a wavelength plate.

As shown in FIG. 14, for example, the phaser 15 may be composed of a variable rotary polarizer 15c such as a Farady rotator 15c and a wavelength plate 15d of a given phase difference Δ located on the optical axis of the light passed through the variable rotary polarizer 15c.

Figure 15:
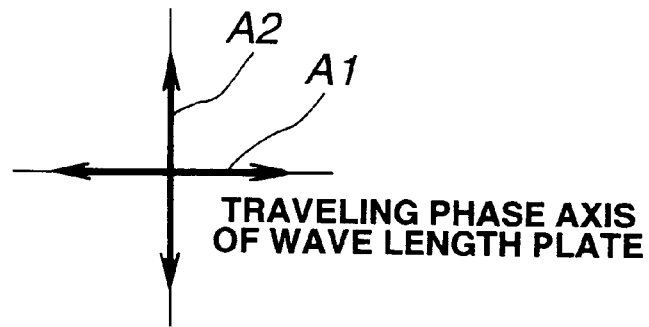
FIG. 15 is a view showing relation between a polarized beam applied from the variable polarizer and an optical axis of the wavelength plate.

Then, the return light from the magneto-optical disk 1 is rotated by the variable rotary polarizer 15c. For example, as shown in FIG. 15, the polarizing direction A1 of the polarized light output from the variable rotary polarizer 15c when reproducing the information from the land is located in parallel to the traveling phase axis of the wavelength plate 15d of the phase difference Δ, and the polarizing direction A2 of the polarized light output from the variable rotary polarizer 15c when reproducing the information from the group is located orthogonally to the traveling phase axis of the wavelength plate 15d of the phase difference Δ. That is, when reproducing the information from the land or the groove, the polarized light to be fired to the wavelength plate 15d by using the variable rotary polarizer 15c is rotated 90 deg so that the phase difference between Δ and −Δ may be equally produced.

In turn, the description will be oriented to another embodiment of the reproducing apparatus for reproducing the information signal from the magneto-optical disk 1.

The reproducing apparatus arranged to use the aforementioned variable rotary polarizer 15c operates to rotate the return light in a manner to cross the polarizing direction of the return light from the land 6 with the polarizing direction of the return light from the groove 5 at right angles. On the other hand, the reproducing apparatus according to the present embodiment is arranged to separate the light beam applied onto the magneto-optical disk 1 into two linear polarized lights whose polarizing directions are crossed at right angles.

Figure 16:
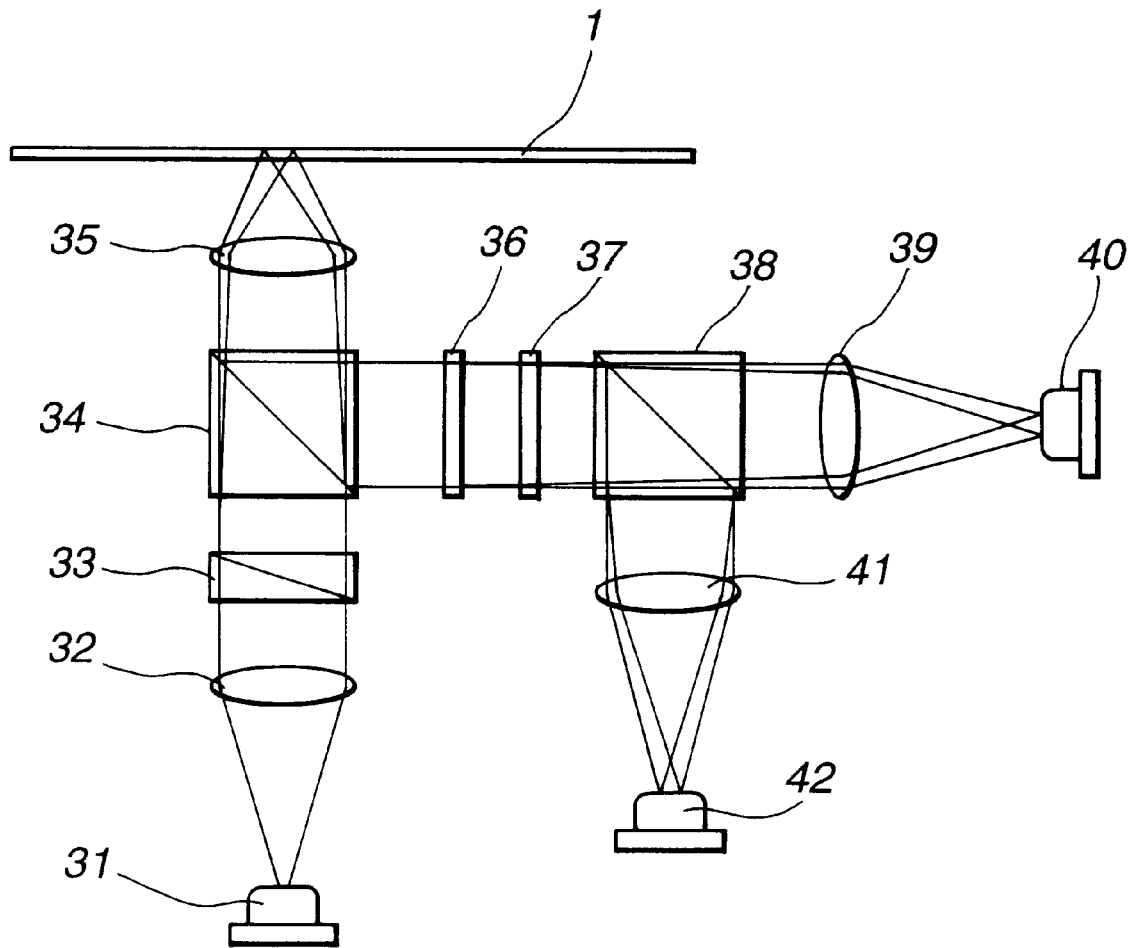
FIG. 16 is a view showing another construction of a reproducing apparatus to which the present invention applies.

As shown in FIG. 16, this reproducing apparatus includes a light source 31 such as a semiconductor laser for emitting a light beam of a given wavelength, a collimator lens 32 for converting the light beam from the light source 31 into parallel beam, a Wollaston prism 33 served as a polarizing beam splitter for separating the parallel light output from the collimator lens 32 into two linear polarized lights whose polarizing directions are crossed at right angles, a beam splitter 34 for separating the light beam from the light source 31 from the return light from the magneto-optical disk 1, and an objective lens 35 for condensing the light beam from the light source 31 onto the magneto-optical disk 1.

The reproducing apparatus includes a phaser 36 for giving a given phase difference to the return light from the magneto-optical disk 1, a half wavelength plate 37 for giving a phase difference of λ/2 to the return light from the magneto-optical disk 1, a polarizing beam splitter 38 for separating the return light passed through the half wavelength plate 37 into a P polarized component and an S polarized component, a first condensing lens 39 for condensing one of the polarized components separated by the polarizing beam splitter 38, a first photo detector 40 for detecting the polarized light condensed by the first condensing light 39, a second condensing lens 41 for condensing the other one of the polarized components separated by the polarizing beam splitter 39, and a second photo detector 42 for detecting the polarized light condensed by the second condensing lens 41.

Figure 17:
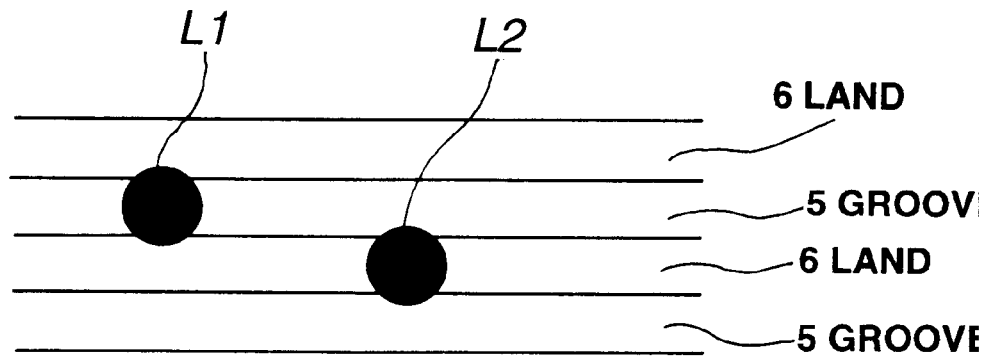
FIG. 17 is a model view showing two spots of a light beam condensed on the land and the groove in the reproducing apparatus shown in FIG. 16.

The Wollaston prism 33 is located on the optical axis between the light source 31 and the magneto-optical disk 1 and serves to separate the light beam from the light source into two light beams whose polarizing states are different from each other. As shown in FIG. 17, one light beam L1 of the beams separated by the Wollaston prism 33 is used for reproducing the recorded information signal, while the other light beam L2 is used for reproducing the information signal recorded on the land 6.

Figure 18:
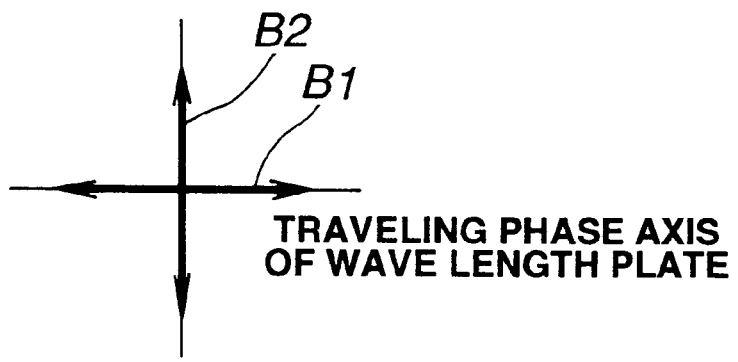
FIG. 18 is a view showing relation between a polarizing direction of a light beam entered into the lands and the grooves and the optical axis of the wavelength plate in the reproducing apparatus shown in FIG. 16.

The phaser 36 is located on the optical axis of the return light from the magneto-optical disk 1 and serves to change the phase difference of the return light from the disk 1. The phaser 36 may be a wavelength plate of a phase difference Δ. As shown in FIG. 18, the traveling phase axis is relocated in parallel to the polarizing direction B1 of the light beam entered into the land 6 and orthogonally to the polarizing direction B2 of the light beam entered into the groove 5. By this operation, like the foregoing case of the variable rotary polarizer 15c, the phase difference of Δ is given to the return light from the land 6 and the phase difference of −Δ is given to the return light from the groove 6.

In this reproducing apparatus, the light beam from the light source 31 is separated through the Wollaston prism 33. One light beam component is entered into the land 6 of the magneto-optical disk 1, while the other light beam component is entered into the groove 6 of the magneto-optical disk 1. Hence, the light axis of the return light from the land 6 is different from the light axis of the return light from the groove 5.

In the reproducing apparatus, therefore, the first photo detector 40 provides a section for detecting the return light from the land 6 and a section for detecting the return light from the groove 5 so that the first photo detector 40 may detect the return light from the land 6 and the return light from the groove 5 independently. Likewise, the second photo detector 42 provides a section for detecting the return light from the land 6 and the return light from the groove 5 so that the second photo detector 42 may detect the return light from the land 6 and the return light from the groove 5 independently.

Further, in this reproducing apparatus, the first photo detector 40 operates to detect the return light from the land 6 and the return light from the groove 5 at the same time. The second photo detector 42 operates to detect the return light from the land 6 and the return light from the groove 5 at the same time. By these operations, the reproducing apparatus enables to reproduce the information signals recorded on the groove 5 and the land 6.

The reproducing apparatus as described above is arranged to reproduce both of the information signals recorded on the land 6 and the groove 5 through the effect of one light pickup. In place, two optical pickups may be prepared for reproducing the information signal recorded on the land 6 and for reproducing the information signal recorded on the groove 5.

In this arrangement, there is located a wavelength plate arranged to match to the phase difference to be given to the return light from the land 6 before the photo detector of the optical pickup for reproducing the information signal recorded on the land 6. Further, there is located a wavelength plate arranged to match to the phase difference to be given to the return light from the groove 5 before the photo detector of the light pickup for reproducing the information signal recorded on the groove 5. By this locations, the return light from the land 6 may contain the corresponding given phase difference and the return light from the groove 5 may contain the corresponding given phase difference.

As is obvious from the foregoing description, according to the present invention, in a case that the narrower track interval is formed on the magneto-optical recording medium where the information signals is recorded on the land and the groove, it is possible to obtain an excellent reproduction signal with a small magnitude of crosstalk.

According to the present invention, therefore, the magneto-optical medium provides two advantages of narrowing the track interval more and greatly increasing the recording density though the medium is arranged to record the information signal on both of the lands and the grooves.

What is claimed is:

1. A magneto-optical recording medium having grooves formed on a substrate and formed to record an information signal on said grooves and lands located between each pair of adjacent grooves, characterized in that:

assuming that a light beam to be applied onto said medium has a wavelength of $\lambda$ and n is an integer of 0 or more, an optical depth d of each of said grooves stays in the range of $(1/12+n/2)\lambda \leq d \leq (1/6+n/2)\lambda$ or $\{-1/6+(n+1)/2\}\lambda \leq d \leq \{-1/12+(n+1)/2\}\lambda$.

2. A magneto-optical recording medium as claimed in claim 1, wherein the optical depth d of said groove stays in $(1/12+n/2)\lambda \leq d \leq (1/8+n/2)\lambda$ or $\{-1/8+(n+1)/2\}\lambda \leq d \leq \{-1/12+(n+1)/2\}\lambda$.

3. A magneto-optical recording medium as claimed in claim 1, wherein when a lens is provided for condensing a light beam on said magneto-optical recording medium has a numerical aperture of NA, an interval between the adjacent tracks is 0.64 $\lambda$/NA or lower.

4. A reproducing apparatus for reproducing an information signal from a magneto-optical recording medium having said information signal recorded on both of grooves and lands of said medium, comprising:

a light source for applying a light beam onto said magneto-optical recording medium;

a phaser located on an optical axis of return light of said light beam from said medium and for changing a phase difference of said return light; and wherein the return from said land is different from the return light from said groove in respect of a variation of said phase difference caused by said phaser, and wherein assuming that said light beam to be applied onto said magneto-optical recording medium has a wavelength of $\lambda$ and n is an integer of 0 or more, the optical depth d of said groove stays in $(1/12+n/2)\lambda \leq d \leq (1/8+n/2)\lambda$ or $\{-1/6+(n+1)/2\}\lambda \leq d \leq \{-1/12+(n+1)/2\}\lambda$.

5. A reproducing apparatus for reproducing an information signal from a magneto-optical recording medium having said information signal recorded on both of grooves and lands of said medium, comprising:

a light source for applying a light beam onto said magneto-optical recording medium;

a phaser located on an optical axis of return light of said light beam from said medium and for changing a phase difference of said return light; and wherein the return from said land is different from the return light from said groove in respect of a variation of said phase difference caused by said phaser, and wherein said phaser provides a variable phaser for changing a phase difference of light passed therethrough depending on a voltage applied thereto.

6. A reproducing apparatus for reproducing an information signal from a magneto-optical recording medium having said information signal recorded on both of grooves and lands of said medium, comprising:

a light source for applying a light beam onto said magneto-optical recording medium;

a phaser located on an optical axis of return light of said light beam from said medium and for changing a phase difference of said return light; and wherein the return from said land is different from the return light from said groove in respect of a variation of said phase difference caused by said phaser, and wherein said phaser provides a rotary polarizer for rotatively polarizing the return light and a phase plate located on an optical axis of light passed through said rotary polarizer.

7. A reproducing apparatus for reproducing an information signal from a magneto-optical recording medium having an information signal recorded on both of grooves and lands of said medium, comprising:

a light source for applying a light beam onto said magneto-optical recording medium;

a polarizing beam splitter located on an optical axis between said light source and said magneto-optical recording medium and for separating the light beam from said light source into two light beam components whose polarizing states are different from each other; and wherein assuming that the light beam to be applied onto said magneto-optical recording medium has a wavelength of 1 and n is an integer of 0 or more, an optical depth d of each of said grooves stays in $(1/12+n/2)\lambda \leq d \leq \{1/6\ n/2\}\lambda$ or $((-1/6+(n+1)\lambda \leq d \leq \{-1/12+(n+1)/2\}\lambda$.

8. A reproducing apparatus for reproducing an information signal from a magneto-optical recording medium having an information signal recorded on both of grooves and lands of said medium, comprising:

a light source for applying a light beam onto said magneto-optical recording medium;

a polarizing beam splitter located on an optical axis between said light source and said magneto-optical recording medium and for separating the light beam from said light source into two light beam components whose polarizing states are different from each other; and a phaser located on an optical axis of the return light from said magneto-optical recording medium and for changing a phase difference of said return light; and wherein one of said separated light beam components is used for reproducing said information signal recorded on said grooves and the other component is used for reproducing said information signal recorded on said lands, and wherein the return light from said lands of said magneto-optical recording medium is different from the return light from said grooves of said medium in respect of a variation of the phase difference of said phaser.

9. A reproducing apparatus as claimed in claim 7 or claim 8, wherein said polarizing beam splitter is composed of a Wollaston prism.

10. A reproducing method comprising the steps of:

forming grooves whose optical depth d stays in $(1/12+n/2)\lambda \leq d \leq (1/6+n/2)\lambda$ or $\{-1/6+(n+1)/2\}\lambda \leq d \leq \{-1/12+(n+1)/2\}\lambda$, where $\lambda$ is a wavelength of a light beam to be applied onto a magneto-optical recording medium and n is an integer of 0 or more;

applying said light beam onto said magneto-optical recording medium having an information signal recorded on both of said grooves and lands located between the adjacent grooves; and detecting return light of said light beam from said magneto-optical recording medium, for reproducing said information signal recorded on said medium.

11. A reproducing method as claimed in claim 10, wherein a phase difference of at least one of said return light from said land and said return light from said groove is changed so that the phase difference of said return light from said land is different from said return light from said groove and then said return light is detected for reproducing said information signal.

12. A magneto-optical disk apparatus for reproducing an information signal from a magneto-optical recording disk having an information signal recorded on both of grooves and lands of said disk, a light source for applying a light beam onto said magneto-optical recording disk;

a polarizing beam splitter located on an optical axis between said light source and said magneto-optical recording disk and for separating the light beam from said light source into two light beam components whose polarizing states are different from each other, and wherein one of said separated light beam components is used for reproducing said information signal recorded on said grooves and the other component is used for reproducing said information signal recorded on said lands, and wherein assuming that the light beam to be applied onto said magneto-optical recording disk has a wavelength of $\lambda$ and n is an integer of 0 or more, an optical depth d of each of said grooves in $(1/12+n/2)\lambda \leq d \leq (1/6+n/2)\lambda$ or $\{-1/6+(n+1)0.2\}\lambda \leq d \leq \{-1/12+(n+1)/2\}\lambda$.

* * * * *